T. Goodrum,
Stone Boring Machine.
Nº 13,646.      Patented Oct. 9, 1855.
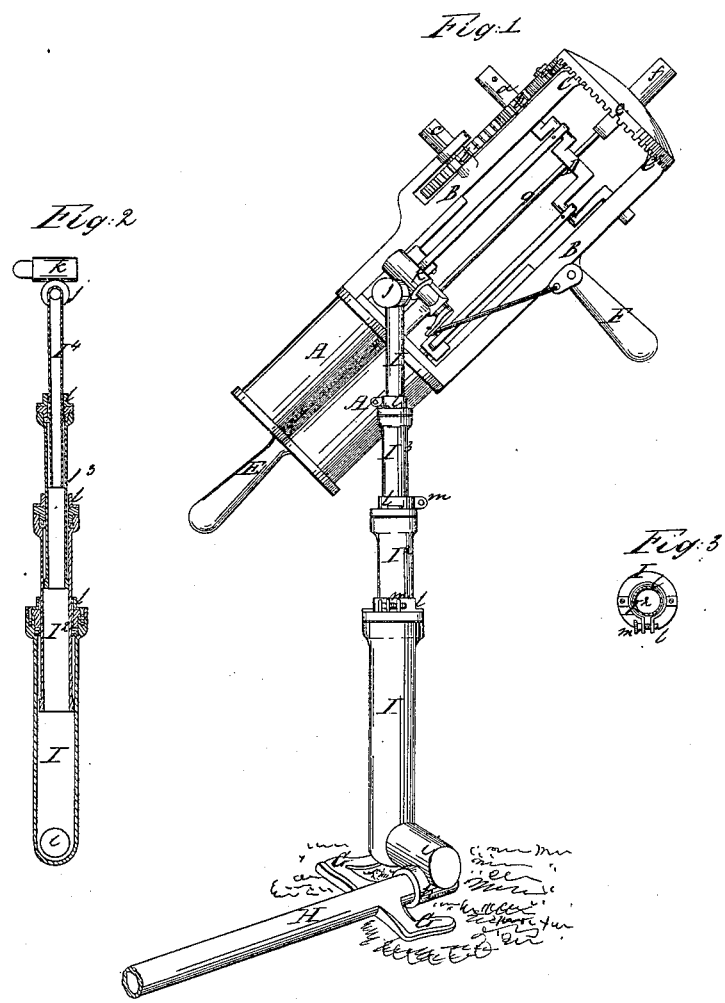

UNITED STATES PATENT OFFICE.

THOS. GOODRUM, OF PROVIDENCE, RHODE ISLAND.

PORTABLE BORING-ENGINE.

Specification of Letters Patent No. 13,646, dated October 9, 1855.

*To all whom it may concern:*

Be it known that I, THOMAS GOODRUM, of the city and county of Providence and State of Rhode Island, have invented a new and useful Engine for Boring Holes in Various Structures and Substances in All Positions; and I do hereby declare that the following is a full, clear, and exact description of the same, reference being had to the accompanying drawings, forming part of this specification, in which—

Figure 1, is an elevation of the engine Fig. 2, is a vertical section of the sliding steam-pipes, and Fig. 3, a horizontal section of the same.

Similar letters of reference indicate corresponding parts in the several figures.

The engine which forms the subject of this invention consists in a portable steam engine which carries one or more auger stocks, either in, attached to, or geared with its main shaft, the said engine receiving steam from a boiler through a flexible pipe which allows it to be carried about and being provided with an arrangement of sliding pipes which enables the whole weight of the engine to be supported by the steam, so that the operator only requires to guide the auger by handles attached to the frame of the engine. The principal feature of my invention consists in the above named arrangement of sliding pipes for enabling the weight of the engine to be supported by the steam, and in some cases, the pressure required to feed the tool, to be given by the same means.

The engine has two cylinders A, A, which are cast together so as to form the main portion of the frame, the other portion consisting of two sides and an arched top B, B, C, cast all in one piece and bolted to the cylinders. The double crank shaft D, has an auger or bit stock $a$, formed at one end and it is geared by a pair of spur wheels $b$, $b'$, with another stock $c$, parallel to $a$, and also by the wheel $b$, through two wheels $d$, and $e$, with a stock $f$, perpendicular to the stocks $a$, and $c$. I have applied to the engine the rotary valve for which Letters Patent were granted to me on the 3rd of April 1855, driving it by a toothed wheel on its spindle $g$, gearing with the wheel $e$, on the stock $f$. I apply one handle E, to the engine between and parallel with the cylinders and another handle F, to one of the sides B, B, of the framing at right angles to the handle E.

G, is a foot or base upon which the engine is supported and H, is a steam pipe attached to the said base. This pipe H, has connected with it by a universal joint $h$, $i$, a metal pipe I, which is shown in the drawing in an upright position. This pipe I, receives a second pipe $I^2$, the pipe $I^2$, receives a pipe $I^3$, and the pipe $I^3$, receives a pipe $I^4$, the said pipes being turned or otherwise fitted to slide steam tight, telescope fashion each in a stuffing box in the head of the pipe below it, and every one except the top one having securely attached to its upper part a clamp $l$, which can be tightened by a screw $m$, upon the pipe which works above and within it to prevent any sliding movement. The top pipe $I^4$, is connected by a universal joint $j$, $k$, with the steam chest K of the engine. The steam which is received from a boiler which is altogether or only temporarily stationary is to be conveyed to the pipe H, by a flexible pipe which allows the engine to be carried about from place to place. From the pipe H, the steam passes through the sliding pipes I, $I^2$, $I^3$, $I^4$, to the engine and it is obvious that in passing through the said sliding pipes it acts on their several transverse sectional areas in such a manner as to force them out from one another and it is this action of the steam which I employ to support the weight of the engine, either wholly or entirely, wholly if the engine can be used with the sliding pipes upright and partly if used in any other position. All the sliding pipes except one are intended to be secured by their respective clamps $l$. The reason for making the sliding pipe in more than two pieces is to have several sizes of pipe so that one may be made to slide, whose area is suitable for the working pressure of the steam to balance as nearly as possible the weight of the engine. Were it not for the different pressures that might be used one sliding pipe only would be necessary. The top joint of the sliding pipe is connected with the engine as nearly as possible to the center of its weight in order that the engine will be well balanced in all its positions and all that the operator will have to do will be to guide it in the proper direction. The lower ends of the sliding pipes should have small flanges to prevent their being driven, by the pressure of steam, entirely out of the pipes which receive them.

The engine may be used for boring auger holes in ship, bridge and dry dock building or for boring holes in many other structures. The auger shafts or stocks may be made adjustable to various positions to enable the sliding pipes to be always kept vertical to support the whole weight of the engine.

In constructing the engine, care should be used to construct all the parts so as to combine lightness and strength, for that purpose I propose to make all the gearing of malleable cast iron.

What I claim as my invention and desire to secure by Letters Patent, is—

1. Conducting the steam to the engine through a pipe which is fitted to slide within another pipe substantially in the manner described, whereby the weight of the engine may be supported by the pressure of the steam.

2. The employment of two or more sliding pipes I, $I^2$, $I^3$, $I^4$, of different sizes, one within the other in combination with suitable clamps $l$, substantially as described, for the purpose of securing all but such one of the said pipes, whose area, acted upon by the working pressure of steam will receive an aggregate pressure about equal to the weight of the engine.

THOMAS GOODRUM.

Witnesses:
PETER H. CAMPBELL,
HENRY SHEPHERD.